United States Patent [15] 3,648,099

Otten et al. [45] Mar. 7, 1972

[54] CIRCUIT ARRANGEMENT IN A DISPLAY DEVICE FOR PRODUCING A LINE-FREQUENCY SAWTOOTH CURRENT HAVING AN AMPLITUDE WHICH VARIES AT THE FRAME FREQUENCY

[72] Inventors: Walter Otten, Hamburg, Germany; Gosse Jan Postma; Jan Joost Rietveld, both of Emmasingel, Eindhoven, Netherlands; Jorg Wolber, Hamburg, Germany

[73] Assignee: U.S. Philips Corporation, New York, N.Y.

[22] Filed: Sept. 5, 1969

[21] Appl. No.: 855,685

[30] Foreign Application Priority Data

July 8, 1969 Germany ........................P 19 34 568.7

[52] U.S. Cl.........................................315/27 GD, 315/27 TD

[51] Int. Cl...........................................................H01j 29/70

[58] Field of Search........................315/27 GD, 27 TD, 27 LC

[56] References Cited

UNITED STATES PATENTS

| | | | |
|---|---|---|---|
| 2,304,057 | 12/1942 | Schade | 315/27 X |
| 3,092,753 | 6/1963 | Steiger | 315/27 |
| 2,745,005 | 5/1956 | Lynch | 315/27 X |
| 3,440,483 | 4/1969 | Kaashoek | 315/27 UX |
| 3,484,648 | 12/1969 | Kanaoka et al. | 315/27 UX |

*Primary Examiner*—Rodney D. Bennett, Jr.
*Assistant Examiner*—J. M. Potenza
*Attorney*—Frank R. Trifari

[57] ABSTRACT

A color TV display system with a circuit for generating in the line deflection coil halves a line-frequency sawtooth correction current whose amplitude varies at the frame frequency. The line deflection current in the line deflection coil halves is supplied by two line generators which are connected in series for direct current across the terminals of a supply source of DC voltage. The junction point of the generators is decoupled for line-frequency signals. A direct voltage which is substantially one-half of the supply voltage and a sawtooth modulation voltage at the frame frequency are both applied to the junction point.

13 Claims, 3 Drawing Figures

Figure 1:
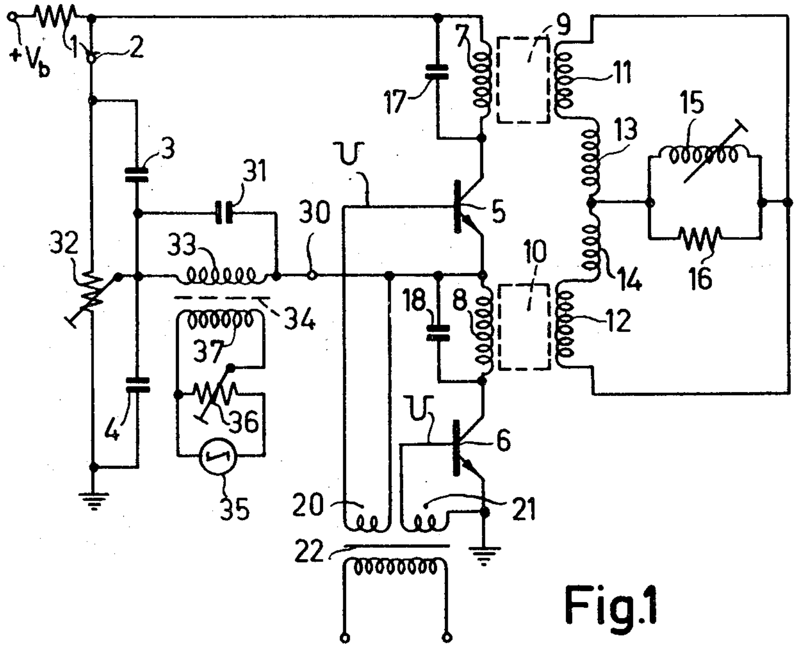

INVENTORS
WALTER OTTEN
BY GOSSE J. POSTMA
JAN J. RIETVELD
JORG WOLBER
AGENT

INVENTORS
WALTER OTTEN
BY GOSSE J. POSTMA
JAN J. RIETVELD
JORG WOLBER
Frank R. [signature]
AGENT

CIRCUIT ARRANGEMENT IN A DISPLAY DEVICE FOR PRODUCING A LINE-FREQUENCY SAWTOOTH CURRENT HAVING AN AMPLITUDE WHICH VARIES AT THE FRAME FREQUENCY

This invention relates to a circuit arrangement in a display device for producing a line-frequency sawtooth correction current having an amplitude which varies at the frame frequency, which display device is provided with line and frame deflection current generators for supplying line-frequency and frame-frequency sawtooth currents having substantially constant peak-to-peak amplitudes, the said line-frequency sawtooth correction current being proportional to the instantaneous value of the line deflection current and of the frame deflection current, while the line deflector coil is divided into two substantially equal coil halves.

U.S. Pat. No. 3,440,483 describes a color television display device in which a line-frequency sawtooth correction current having an amplitude which varies at the frame frequency is used to correct deflection. From the beginning to the end of the scan of a frame period, this line-frequency correction current must first decrease from a given value to zero substantially linearly, and subsequently increase in the reverse direction in a substantially equal degree. This correction current is superimposed on the deflection current which flows in the line-deflector coil and/or the frame-deflector coil. The deflection current has a substantially constant peak-to-peak amplitude. Since the deflector coil is divided into two coil halves arranged substantially symmetrically one on each side of the neck of the display tube, the correction current can be added to the deflection current in one coil half and be subtracted from the deflection current in the other coil half. As a result, the magnetic deflection field of one coil half will be increased and that of the other coil half will be decreased in a substantially equal degree.

As has been described in the above-mentioned patent, the so-called anisotropic astigmatism of a deflector coil gives rise to a distortion in that an electron beam having a circular or elliptical cross section is given the form of a tilted ellipse, the distortion being dependent on the degree of deflection. In other words, this distortion is most serious in the corners of the image displayed and gives rise to errors in color register. In the said patent it has been shown that it is possible to eliminate this distortion by means of a distortion of opposite sense produced by the said correction current.

In the device according to the said patent application, the frame-frequency amplitude variation of the line-frequency sawtooth current is effected by means of a modulator controlled by the frame-deflection current generator. This modulator takes the form of a multiplier to which information about the line and frame deflection currents is supplied. It is an object of the present invention also to generate the said correction current and the circuit arrangement according to the invention is characterized in that the line deflection current flowing through the line deflector coil halves is supplied by two generators which for direct current are connected in series between the two terminals of a direct-current supply source. In addition, the junction point of the generators is decoupled for the line frequency. Both a direct voltage which is substantially one half of the supply voltage and a sawtooth modulation voltage produced by the frame deflection generator are applied to this point.

Since only one-half of the supply voltage is applied to each of the generators, the circuit arrangement according to the invention is particularly suitable to be transistorized without the need for special means for reducing the supply voltage. Also, the desired frame-frequency variation of the line-frequency correction current is effected by simple means and the multiplier used in the circuit arrangement according to the cited patent can very simply be designed as a supply-voltage modulator, using the two generators themselves provided in the line output stage. It will further become apparent that adjustment of the circuit arrangement according to the invention is particularly simple.

Figure 2:
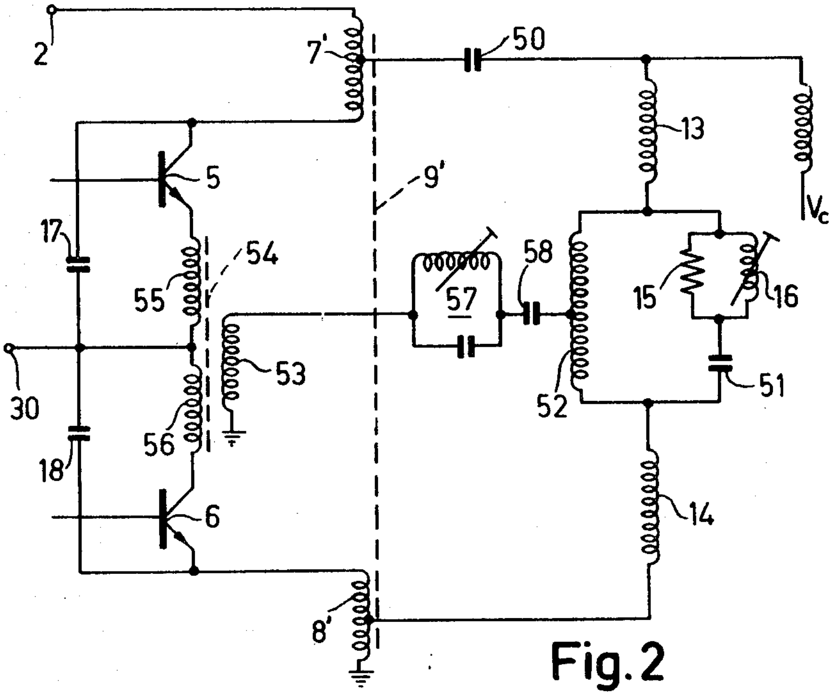
Figure 3:
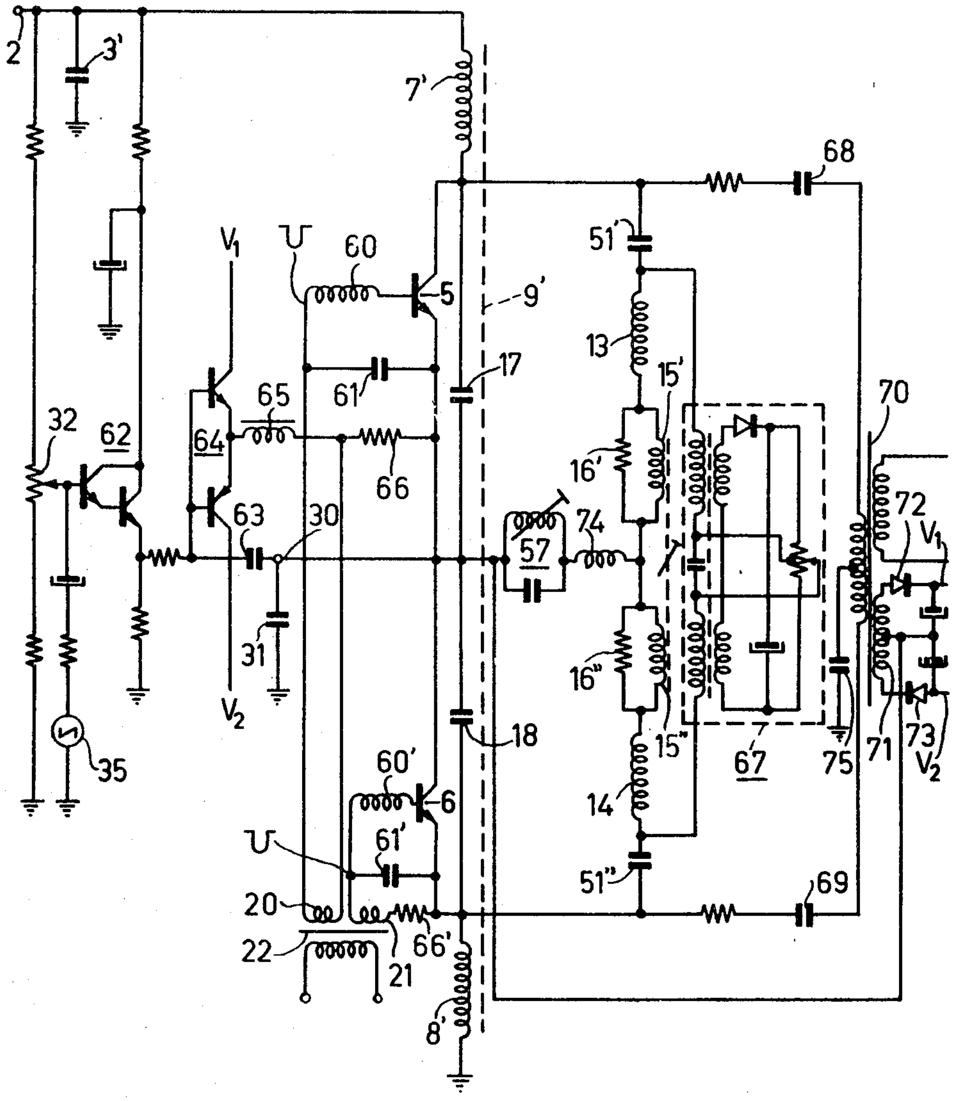

The invention will now be described, by way of example, with reference to the accompanying drawings, in which:

FIG. 1 shows a simplified embodiment of a circuit arrangement according to the invention using two line output transformers, FIG. 2 shows part of the circuit arrangement of FIG. 1 using a single-line output transformer, and FIG. 3 is a complete circuit diagram of an embodiment of the circuit arrangement according to the invention.

In FIG. 1, the supply voltage, which may be derived from the AC supply lines through a rectifier and a storage capacitor, is taken from a terminal $+V_b$. This voltage is applied to a terminal 2 through a resistor 1. The voltage at the terminal 2 is smoothed by means of the series arrangement of two large capacitors 3 and 4, which may be electrolytic capacitors, which is connected to ground. The supply voltage at the terminal 2 is further applied to two NPN-output transistors 5 and 6, which may both be of the type BU 105 and which for direct current are connected in series between the terminal 2 and ground. The primary windings 7 and 8 of two line-deflection transformers 9 and 10 are included in the collector leads of the transistors 5 and 6, respectively. These transformers preferably have substantially rectangular cores, on the various limbs of which the individual windings are wound. The transformers 9 and 10 have secondary windings 11 and 12, respectively, which at one end are connected to one another and at the other end are connected to deflector coil halves 13 and 14, respectively. The other ends of the deflector coil halves 13 and 14 are connected to one another and, through a device serving for linearity correction and comprising the parallel combination of a coil 15 provided with adjustable bias magnetization and a resistor 16, to the junction of the windings 11 and 12. For tuning to the flyback period, capacitors 17 and 18, which may partially be formed by the stray capacitances, are connected in parallel with the primary windings 7 and 8, respectively.

Secondary windings 20 and 21 of an output transformer 22 of a driver stage (not shown) are connected between the bases and the emitters of the transistors 5 and 6, respectively. These windings deliver negative pulses in the rhythm of the line frequency. The junction point of the two line generators, i.e., the emitter of the transistor 5, is connected to the junction point of capacitors 3 and 4 through a terminal 30 and a capacitor 31. The capacitor 31 is chosen so that it can be considered as a short circuit for signals at the line frequency, but not for the frame frequency. Thus, transistors 5 and 6 form two line deflection generators which operate independently, and through transformers 9 and 10 generate line-deflection currents in the line-deflector coil halves 13 and 14, the coupling between the two generators due to these coils being weak.

Between the terminal 2 and ground there is connected a potentiometer 32 which is directly connected to the terminal 30 so that the supply voltages for the two generators can be made different. As a result, the current amplitudes in the deflector coil halves 13 and 14 can be made different so as to counteract any asymmetry which may occur in the circuit arrangement. In order to effect the correction which is dependent on the frame deflection, in the embodiment shown in FIG. 1, a winding 33 is connected between the terminal 30 and the junction of the capacitors 3 and 4. The winding 33 is the secondary of a transformer 34. A frame-frequency sawtooth voltage produced by a generator 35 is applied to a potentiometer 36 so that between one end of this potentiometer 36 and its sliding contact an adjustable voltage is produced, which is applied to the primary 37 of the transformer 34. By this step the supply voltage for the two line generators is modulated by a frame-frequency sawtooth voltage and thus the desired difference of the deflection currents flowing through the line-deflector coil halves 13 and 14 is realized.

In the embodiment shown in FIG. 1 two line output transformers are used. In the modified embodiment shown in FIG. 2, in which elements corresponding to those of FIG. 1 are designated by like reference numerals, only a single-line output transformer is used. In FIG. 2, windings 7' and 8' are wound on the same core 9'. Line deflector coil halves 13 and 14 are connected in series between two symmetrical tappings on windings 7' and 8'. A blocking capacitor 50 is connected between the tapping on the winding 7 and one end of the deflector coil half 13. Through a choke coil a variable direct voltage $V_c$ is applied to the junction of the capacitor 50 and the line deflector coil half 13. The voltage $V_c$ may be either negative or positive and serves for horizontal centering of the picture. A linearity circuit 15, 16 is connected in series with a capacitor 51 for the so-called S correction between the line deflector coil halves 13 and 14. This series combination is shunted by a coil 52, to a center tapping on which the correction current is supplied. This current is taken from a secondary 53 of a transformer 54 having two primary windings 55 and 56 which are connected in series between the emitter of the transistor 5 and the collector of the transistor 6. The junction of the windings 55 and 56 is connected to the terminal 30. Across the windings 55 and 56 line-frequency sawtooth voltages are produced which are modulated by the frame-frequency sawtooth voltage taken from the terminal 30.

If the configuration described were perfectly symmetrical, the winding 53 could be dispensed with and the center tapping on the coil 52 could be decoupled for the line frequency. Thus, a bridge circuit would be formed, the terminal 30 and the center tapping on the coil 52 always being at the same potential. Because the potential at the terminal 30 varies at the frame frequency, the potential of the center tapping on the coil 52 would proportionally vary in the same manner. Since such symmetry is difficult to realize in practice, the winding 53 is connected to the center tapping on the coil 52. As a result, two mutually opposite correction currents flow through the deflector coil halves 13 and 14. Consequently, in one deflector coil half one of these correction currents is added to the deflection current and in the other deflector coil half the second correction current is subtracted from the deflection current. In addition, a parallel circuit 57 and a blocking capacitor 58 are included in the correction current supply lead between the winding 53 and the center tapping on the coil 52. The parallel circuit 57 serves to vary the form of the correction in the manner, and for the reasons, described in U.S. patent application Ser. No. 40,873, filed May 27, 1970. It should be noted that the coil 52 also offers a path to the centering current, which is a direct current.

Since the potentiometer 32 is connected between the supply voltage terminal 2 and ground and the supply voltage is comparatively high, the potentiometer 32 must have a comparatively high resistance. When asymmetry occurs in the circuit arrangement, for example, owing to the fact that the transistors 5 and 6 are not identical, this asymmetry cannot readily be eliminated because the terminal 30 must be considered as a low-resistance point for direct current and also for the low frame frequency, so that it is desirable for the potentiometer 32 to have a low resistance. This is achieved in the embodiment shown in FIG. 3, which furthermore is a complete circuit diagram of a circuit arrangement according to the invention.

In FIG. 3, the two line output generators 5 and 6 take the forms described in U.S. patent application Ser. No. 737,009 filed June 14, 1968 and U.S. Pats. No. 3,504,224 and 3,576,464, i.e., without an external booster diode and with coils 60 and 60' included in the base leads of the transistors 5 and 6, respectively, and capacitors 61 and 61' connected between the emitter of the respective transistor and the other end of the coil 60 or 60'. A frame-frequency sawtooth voltage produced by the frame deflection generator 35 is applied to the sliding contact of the potentiometer 32 through a capacitor. The sliding contact of the potentiometer 32 is also connected to the base of a Darlington amplifier 62 connected in emitter follower configuration, the output of which is connected to the terminal 30 through a large-capacitance capacitor 63. The terminal 30 is connected to the junction point of the emitter of the transistor 5 and the collector of the transistor 6. Further, the output of the Darlington combination 62 is connected to a complementary pair 64 comprising an NPN-transistor and a PNP-transistor, the output of the pair being connected through a choke 65 to the lower end of the winding 20. A resistor 36 of a small value, for example, 2 ohms, is connected between this lower end, and similarly an equal resistor 66' is connected between the lower end of the winding 21 and the emitter of the transistor 6. The potentiometer 32 and the Darlington combination 62 are fed with the supply voltage from the terminal 2. Thus, the desired reduction of the impedance of the voltage sources applied to the generators 5 and 6 is achieved, and the potentiometer 32 may now have a high resistance.

Another feature of the invention shown in FIG. 3 is that the supply voltage 2 is modulated by a frame-frequency parabolic voltage so that the line deflection current is also modulated thereby. Consequently, the envelope of the line deflection current takes the form desired for correction of the so-called east-west pincushion distortion. For this purpose it is required that the smoothing capacitor 3' for the supply voltage 2 should have a not too large capacitance. If the slide contact of the potentiometer 32 is adjusted so that the voltage at the junction of the generators 5 and 6 is exactly one half of the supply voltage, one half of the frame-frequency parabolic voltage is present at this point. Line deflector coil halves 13 and 14 are connected in series with two capacitors 51' and 51'', respectively, which together form the S-correction capacitor, and with two linearity circuits 15', 16' and 15'', 16'', respectively. The coils 15' and 15'' are bifilarly wound on the same core for the sake of symmetry. If the entire circuit arrangement is satisfactorily symmetrical, the electric center of the line deflector coil halves, i.e., the junction of the two linearity circuits 15', 16' and 15'', 16'', is at an alternating voltage which is equal to one-half of the parabolic voltage at the terminal 2. In the absence of the frame-frequency modulation the potential at the junction of generators 5 and 6 is also equal to this alternating voltage, so that the correction current to be produced by the coil halves 13 and 14 is not modulated by the parabolic voltage at the terminal 2. Such an east-west modulation of the correction current would be highly undesirable since the envelope of this correction current at the beginning and at the end of each frame period would be smaller than in the middle of the period, whereas exactly the opposite is desired.

The circuit 67 in known manner generates a centering current which flows through the deflection coil halves 13 and 14. The line output transistors 5 and 6 also drive the primary of a transformer 70, a secondary winding of which serves to produce the high voltage required for the final anode of the display tube. The primary winding of the high-voltage transformer 70 is coupled to the transistors 5 and 6 through two capacitors 68 and 69 which have a low capacitance to provide a certain protection for the switching transistors 5 and 6 in the case of a flashover in the display tube. On the core of the high-voltage transformer 70 there is also wound a secondary 71 having a center tapping which is connected to the terminal 30. To the ends of the winding 71 two diodes 72 and 73 are connected in opposite senses. These diodes rectify the voltage peaks which occur during the line flyback so that after smoothing two direct voltages $V_1$ and $V_2$ are set up at the other connections of the said diodes. With respect to the potential of the terminal 30 these voltages are equal in absolute value and of opposite polarities, and they feed the complementary pair 64.

The purpose of the complementary pair 64 and of the small resistors 66 and 66' is to ensure that the current delivered by the Darlington combination 62 is greatly reduced when there is an asymmetry in the circuit. Such an asymmetry may be due, for example, to unequal losses of the inductances, to temperature differences between the switching transistors, to differences in the switchoff times of these transistors, etc. If the complementary pair 64 were absent, this asymmetry would cause the potentials of the output emitter of the Darlington combination 62 and of the terminal 30 to deviate from one another so that the combination 62 would have to deliver a large current. With the pair 64 provided in the circuit as shown in FIG. 3, and if the potential of the terminal 30 is lower than that of the output emitter of the combination 62, the NPN-transistor of the pair 64 will become conductive and a positive voltage is added to the control voltage of the transistor 5. During the forward stroke there is little change because this control voltage is very large. During the flyback period, however, a smaller control voltage is required to switch off the transistor 5. Consequently, a longer time will be required to remove the excess change carriers present in the transistor 5 at the instant of the switching-off. Owing to the longer conductive period of the transistor 5, the potential of the terminal 30 is raised so that equilibrium is restored. Similarly, the switchoff time of the transistor 5 is shortened when the potential of the terminal 30 tends to become higher than that of the output emitter of the combination 62. The resistor 66' is equal to the resistor 66 and ensures satisfactory symmetry. The transistors of the complementary pair 64 are germanium transistors because they have a lower base emitter threshold voltage, namely about 0.2 volt, so that the voltage applied to the bases of the switching transistors can at most be +0.2 volt or −0.2 volt. This ensures that the circuit arrangement is symmetrical under any conditions.

Similarly to what is the case in the circuit arrangement shown in FIG. 2, in principle the terminal 30 need not be connected to the junction of the line deflector coil halves 13 and 14, and this junction must be decoupled for the line frequency. Since the circuit arrangement must be rigorously symmetrical, however, it is desirable for the terminal 30 and this junction to be connected to one another. Furthermore, this connection includes the parallel circuit 57, which serves for the shaping of the correction current, as has been described in the aforesaid U.S. Pat. application Ser. No. 40,873. A coil 74 is connected in series with the parallel circuit 57 and the center tapping on the primary of the high-voltage transformer 70 is connected to earth through a capacitor 75. The coupling between the line deflector coil halves 13 and 14 may be regarded as a negative inductance −M. The coil 74 is given an inductance such that the sum of the inductive components of the coil 74, of the circuit 57 (which, as is known is tuned to a frequency higher than the line frequency, so that it behaves as an inductance for this frequency) and of the circuits 15', 16' and 15'', 16'' becomes equal to +M. As a result, the coupling between the coil halves 13 and 14 and hence that between the two generators has become substantially zero. By means of the elements 74 and 75, the generator for the correction current is tuned to a resonant frequency the period of which is about twice the line flyback time. This also results in that the line output generator and the correction current generator are decoupled from one another so that they cannot influence one another.

In practice, the circuit arrangement is adjusted as follows: The beam current of the "blue" electron gun of the display tube is suppressed and no frame-frequency signal is applied to the sliding contact of the potentiometer 32, the picture to be displayed being a so-called "convergence pattern," i.e., a picture composed of a number of vertical and horizontal lines. After the picture has been converged statically, i.e., at the center, the green and red horizontal lines do not coincide on the screen of the display tube, but cross one another owing to the so-called anisotropic astigmatism. By means of the potentiometer 32 the crossing points are vertically aligned. Then the frame-frequency sawtooth voltage is applied to the slide contact of the potentiometer 32 with an amplitude such that the green and red horizontal lines coincide in the corners of the screen of the display tube. The so-called convergence circuits ensure that these lines coincide on the remainder of the screen, but these circuits do not form a part of the present application. The above shows that the desired color register in the corners is adjustable in a very simple manner by means of the circuit arrangement according to the invention.

It should be noted that the windings 7' and 8' in the circuit arrangement of FIG. 3 in actual fact do not form a line transformer but are intercoupled choke coils. It will be appreciated that the principle of the invention is not affected if the two generators should be made of elements other than transistors. For example, electron tubes or field-effect transistors connected in a similar configuration could alternatively be used.

We claim:

1. In a television display device a circuit for generating a line-frequency sawtooth correction current having an amplitude which varies at the frame frequency comprising, a line-deflection current generator and a frame-deflection current generator for supplying line-frequency and frame-frequency sawtooth currents having substantially constant peak-to-peak amplitudes, the said line-frequency sawtooth correction current being proportional to the instantaneous value of the line deflection current and of the frame deflection current, a line deflector coil which is divided into two substantially equal coil halves, first and second generators for supplying the line deflection current flowing through the line deflector coil halves, a direct voltage supply source, means connecting the two generators in series for direct current between the two terminals of said direct-voltage supply source, means for decoupling the junction point of the generators for signals of the line frequency, and means for applying to said junction point both a direct voltage which is substantially one half of the supply voltage and a sawtooth modulation voltage at the frame deflection frequency.

2. A circuit as claimed in claim 1, wherein the output lead of each of the two generators includes a line output transformer, and means connecting the secondary winding of each transformer to a respective one of the line deflector coil halves.

3. A circuit as claimed in claim 2 wherein the transformer secondary windings are connected to one another at one end, means interconnecting the line deflector coil halves at one end, and means connecting a device for linearity correction between the junction points of the secondary windings and the coil halves.

4. A circuit as claimed in claim 1 further comprising means connecting the line deflector coil halves in series, an impedance element, and means for coupling the junction point of the two generators to the junction point of the line deflector coil halves through said impedance.

5. A circuit as claimed in claim 1 wherein said voltage applying means includes an emitter follower arranged so that substantially one-half of the supply voltage and the frame-frequency modulation voltage are applied to the junction point of the two generators through said emitter follower.

6. A circuit as claimed in claim 1 characterized in that the supply voltage is modulated by a frame-frequency parabolic voltage used for the correction of the east-west pincushion distortion, and that the voltage at said junction point, which is substantially equal to one-half of the supply voltage, is modulated by a voltage equal to one-half of the said parabolic voltage.

7. A circuit arrangement as claimed in claim 5 wherein the two generators comprise transistors to the base electrodes of which line-frequency switching control voltages are applied, characterized in that the voltage substantially equal to one half of the supply voltage is applied to the junction point of the two generator transistors by means of a complementary pair of transistors which are connected in series between direct voltages which are positive and negative, respectively, relative to said junction point, means interconnecting the base electrodes of said complementary transistors together to the output of the emitter follower, means coupling the interconnected emitters of the complementary transistors to said junction point through a symmetrizing resistor which is also included in the base circuit of one of the two generator transistors, and an equal resistor connected in the base circuit of the other generator transistor.

8. A television display system comprising a cathode-ray tube with a line deflection coil system and a field deflection coil system, said line deflection coil system comprising two substantially symmetrical coil halves arranged on the cathode-ray tube, a line deflection current generator and a field deflection current generator for supplying line frequency and field frequency sawtooth currents to said line and field coil systems, respectively, and a circuit for generating a line frequency sawtooth correction current whose amplitude varies at the field frequency comprising, a source of DC voltage, said line generator comprising first and second amplifier devices connected in series for direct currents across the terminals of said DC voltage source, means for decoupling the junction point of said amplifier devices for line frequency signals, means for applying to said junction point a DC voltage which is substantially one half of the DC supply voltage, and means for coupling a sawtooth modulation signal of the field frequency to said junction point so that the resultant deflection currents through the coil halves are unequal.

9. A display system as claimed in claim 8 further comprising a transformer with a primary winding coupled to said field deflection generator and a secondary winding for deriving said sawtooth modulation signal, a voltage divider connected across the DC voltage source for deriving said DC voltage for the junction point, and means connecting said secondary winding between said junction point and a tapping on the voltage divider at which said DC voltage is derived.

10. A display system as claimed in claim 8 wherein said first and second amplifier devices comprise first and second transistors, first and second transformers, means connecting the primary winding of the first transformer, the first transistor, the primary winding of the second transformer, and the second transistor in series across said DC voltage source, and means connecting the secondary winding of the first transformer, the two coil halves, and the secondary winding of the second transformer in series with one another.

11. A display system as claimed in claim 8 wherein said first and second amplifier devices comprise first and second transistors, first and second inductors, means connecting the first inductor, the first and second transistors and the second inductor in series across said DC voltage source, a center tapped coil, means connecting one coil half, the center tapped coil, and the other coil half in series between tap points on said first and second inductors, and means for coupling said sawtooth modulation signal to the center tap on said coil.

12. A display system as claimed in claim 11 wherein said coupling means comprises a transformer with a center tapped primary winding and a secondary winding, means connecting the primary winding in series between said first and second transistors with the center tap directly connected to the junction point, and means connecting the secondary winding to the center tap on said coil so that mutually opposite correction currents flow in the deflection coil halves.

13. A display system as claimed in claim 8 further comprising a voltage divider connected across the DC voltage source for deriving said DC voltage for the junction point, an emitter follower with an output electrode connected to said junction point and an input electrode connected to the output of the field deflection generator and a tapping on the voltage divider at which said DC voltage is derived.

* * * * *